United States Patent
Scorrano et al.

(10) Patent No.: US 9,084,510 B2
(45) Date of Patent: Jul. 21, 2015

(54) BEVERAGE DISPENSER WITH WHIPPER ASSEMBLY

(75) Inventors: Lucio Scorrano, Yverdon-les-Bains (CH); Richard Luke Murphy, Chagrin Falls, OH (US); Cedric Rey, La Sarraz (CH); Albert Zsolt, Bussigny (CH); Larry Sacha Baudet, Preverenges (CH); Jonathan Gebs, Geneva (CH)

(73) Assignee: Nestec S.A., Vevey (CH)

( * ) Notice: Subject to any disclaimer, the term of this patent is extended or adjusted under 35 U.S.C. 154(b) by 225 days.

(21) Appl. No.: 13/878,940

(22) PCT Filed: Oct. 13, 2011

(86) PCT No.: PCT/EP2011/067920
§ 371 (c)(1),
(2), (4) Date: Apr. 11, 2013

(87) PCT Pub. No.: WO2012/049265
PCT Pub. Date: Apr. 19, 2012

(65) Prior Publication Data
US 2013/0193595 A1    Aug. 1, 2013

(30) Foreign Application Priority Data
Oct. 14, 2010    (EP) .................................... 10187565

(51) Int. Cl.
A47J 31/40 (2006.01)
A47J 31/44 (2006.01)
B67D 1/00 (2006.01)
B01F 3/04 (2006.01)
A23G 1/10 (2006.01)

(52) U.S. Cl.
CPC ............. *A47J 31/4496* (2013.01); *A23G 1/105* (2013.01); *A47J 31/40* (2013.01); *A47J 31/401* (2013.01); *B01F 3/04446* (2013.01); *B67D 1/0015* (2013.01); *Y10T 29/49723* (2015.01)

(58) Field of Classification Search
CPC .... A47J 31/40; A47J 31/4496; B67D 1/0015; B01F 3/04; B01F 3/04446; B01F 3/04453; A23G 1/105
USPC ...................... 261/83, 84; 99/323.1; 426/474; 222/145.5, 145.6, 190; 366/343
See application file for complete search history.

(56) References Cited

U.S. PATENT DOCUMENTS 6,698,625 B2 *    3/2004    Ufheil et al. .................. 222/190

FOREIGN PATENT DOCUMENTS

| EP | 0843983 | 5/1998 |
|----|---------|--------|
| EP | 2105076 | 9/2009 |
| FR | 2707618 | 1/1995 |
| WO | WO03068039 | 8/2003 |

* cited by examiner

*Primary Examiner* — Robert A Hopkins
(74) *Attorney, Agent, or Firm* — K&L Gates LLP

(57) ABSTRACT

The invention concerns a beverage dispenser comprising: a frame (1) for supporting the components of the dispenser, a whipper assembly (2) comprising a whipper 9b housing (21), a whipper device (22) and a back wall (23), the whipper housing and the back wall forming a whipper chamber (24) in which is lodged the whipper device, a drive shaft (3) for driving the whipper device (22), said drive shaft being supported by the frame (1), detachable connection means (4a, 4b) for attaching the back wall to the whipper housing, wherein it further comprises detachable connection means (5) for attaching the whipper housing to the frame.

11 Claims, 7 Drawing Sheets

BEVERAGE DISPENSER WITH WHIPPER ASSEMBLY

CROSS REFERENCE TO RELATED APPLICATIONS

The present application is a National Stage of International Application No. PCT/EP2011/067920, filed on Oct. 13, 2011, which claims priority to European Patent Application No. 10187565.6, filed Oct. 14, 2010, the entire contents of which are being incorporated herein by reference.

FIELD OF THE INVENTION

The present invention relates to a dispenser for the production of beverages implementing a whipper device.

BACKGROUND OF THE INVENTION

Many beverages like espresso and other coffee beverages, milk beverages, chocolate beverages, . . . are often prepared by mixing a food soluble powder or a food liquid concentrate with a diluent. Mixing devices are known for speedier preparation of such beverages by mixing the soluble food component with the diluent, such as water. These devices typically comprise a mixing chamber in which the soluble component and the diluent are fed. The diluent can be introduced into the dissolution chamber in order to create a whirlpool to efficiently dissolve the soluble component in the hot water or the hot diluent can be introduced under the form of jets that provides mixing, dissolving and frothing. The mixture can also eventually be frothed by a whipper in a whipping chamber to reconstitute the beverage and produce foam. The beverage is then usually evacuated from the mixing chamber through the bottom of the mixing chamber and dispensed into a receptacle for drinking.

The internal parts of the dispenser that are in contact with the diluted food component must be regularly cleaned to avoid the growth of bacteria due to residues of beverages in the machine and avoid clogging. This cleaning usually concerns at least the dissolution chamber and the whipping chamber which comprise several mechanical components. For cleaning operation, theses parts must be dismantled, then cleaned and then reassembled. This operation takes time and it must done by people that have been trained for the disassembling and the reassembling to avoid errors and further failure in the beverages production. Usually this cleaning is made by an operator dedicated to the maintenance of the beverages production machines.

Now there is need for decreasing the time for the cleaning operation to limit the perior of time during which the dispenser is not operable. There is also a need for having this operation made by any non trained person so that it is not necessary to ask a specific operator to come and clean the machine. The cleaning should be made by any person briefly trained on the cleaning operations. This cleaning operation must also be so short that he can be made more often depending on the nature of the food ingredients.

EP 2 105 076 proposes a beverage dispenser in which the cleaning operation is improved. This dispenser improves the easy dismantling of the different components of the dispenser in particular the housing and the back wall of the mixing chamber and the impeller. More precisely the easy dismantling consists in first separating the housing of the mixing chamber from the back wall of the mixing chamber and the impeller; the back wall of the mixing chamber remains fixed to the frame and the impeller remains anchored to the drive shaft. Then in a second step the housing of the mixing chamber is separated from the frame and by moving it from its mounted position to its dismounted position, the whipper is also moved towards the free end of the drive shaft and dismounted. The drive shaft presents a specific cross section or the impeller is made of a specific resilient material so that it cannot be moved out of the drive shaft by hand alone between the first and the second dismantling steps.

Although this dispenser enables an easy dismantling of the different components of the whipping unit, it presents several drawbacks. First it presents the risk of dirtying the dispenser during the first step of dismantling the whipper housing. Actually if the chamber still contains some liquid, then this liquid would fall downwards: it could fall from the mixing housing during its displacement from the machine to a work surface and from the back wall until it is also placed on the work surface. It could cause as lot of mess. Secondly with this dispenser the dismantling requires the operator to displace himself two times in front of the dispenser: for the first step and then for the second step. If the work surface for cleaning the whipping unit components is not just aside from the dispenser, the operator loses time. Thirdly in the dispenser of the prior art, the operator is not obliged to dismantle the back wall and the impeller from the frame, he can clean them on the frame. Yet such a cleaning is not optimal and the operator who wants to save time can tend towards never dismantling these elements from the frame and never operating a correct cleaning.

One aim of the present invention is to solve these problems and to propose a beverage dispenser comprising a whipping unit of which components can be easily and rapidly dismantled for cleaning.

SUMMARY OF THE INVENTION

According to a first aspect, the invention concerns a beverage dispenser comprising:
  a frame for supporting the components of the dispenser,
  a whipper assembly comprising a whipper housing, a whipper device and a back wall, the whipper housing and the back wall forming a whipper chamber in which is lodged the whipper device,
  a drive shaft for driving the whipper device, said drive shaft being supported by the frame,
  detachable connection means for attaching the back wall to the whipper housing,
wherein it further comprises detachable connection means for attaching the whipper housing to the frame.

The whipper assembly of the dispenser of the present invention comprises a whipper housing and a back wall configured for forming a whipping chamber when they are assembled together. The whipping assembly also comprises a whipper device for whipping the prepred beverage such as an impeller, a rotating disk, . . . . The whipper device is driven by a driveshaft supported by the frame and extending through the back wall of the whipper assembly.

Some components of the whipper assembly of the beverage dispensers are assembled with connection means that can be detached for easy disassembling and then cleaning. In particular, the back wall and the whipper housing are attached through detachable connection means. Moreover the whipper housing is attached to the frame through detachable connection means. These detachable connection means can be any connection means that can be reversely disconnected and then reconnected like cam and cam tracks, clips or magnetic parts. According to the preferred embodiment the detachable connection means for attaching the back wall to the whipper housing is composed of at least a cam and at least a corresponding cam track. Preferably the at least one cam is present on the whipper housing and the at least one cam track is a slot in the back wall which fits with the cam. The cam track can be designed so that the connection enables the linear sliding of the whipper housing cam in the back wall cam track and then the rotating sliding of the whipper housing cam in the back wall cam track to anchor the whipper housing in the back wall.

According to the preferred embodiment the frame comprises a receiving area for positioning the whipper assembly and the receiving area and the whipper housing present corresponding detachable connection means. These detachable connection means between the receiving area and the whipper housing can be any connection means that can be reversely disconnected and then reconnected. Preferably the receiving area of the frame is a cylinder in which the whipper chamber is able to slide. The detachable connection means of the receiving area can be a locking means pivotally mounted to the cylinder at two symmetric pivot points. In particular, the detachable connection means of the whipper housing can be a guiding pin and the locking means can comprise a slot cooperating with said guiding pin so that said guiding pin is able to slide in the slot while the locking means is pivoted and while the whipper housing is linearly slid out of the receiving area.

The whipper assembly can comprise a handle for helping its removal from the receiving area of the frame when the locking means are disengaged.

The locking means can comprise a handle to help its rotation while connecting or disconnecting the whipper assembly from the receiving area.

According to a specific embodiment the whipper assembly can comprise a dissolution chamber above the whipper housing. The dissolution chamber and the whipper housing can be moulded in one single piece. The outlet of the dissolution chamber comes out in the whipper housing. Preferably the whipper assembly can comprise guiding means for positioning the dissolution chamber relatively to the frame. This guiding means is at least one tube able to fit in a corresponding hole in the frame. According to a preferred mode the at least one tube is a diluent supply tube.

According to the preferred embodiment of the present invention the back wall of the whipper assembly comprises:
  an opening for holding the driving end of the drive shaft and
  a recess for positioning the whipper device.

Preferably at least one of the driving end of the drive shaft or the whipper device is made at least partially of a magnetic material and the other of a metallic material. Consequently, when the whipper assembly is reconnected to the frame, the whipper device is attracted by the drive shaft end and automatically find its position in the recess of the whipper device.

According to a second aspect the invention concerns a method for cleaning a beverage dispenser according to any of the precedent claims comprising the steps of:
  disconnecting the whole whipping assembly from the frame, and then
  disconnecting the back wall from the whipper housing,
  separately cleaning the back wall, the whipper housing and the whipper member,
  connecting the back wall and the whipper housing with the whipper member in the whipper chamber,
  connecting the whole whipping assembly to the frame.

The whipper assembly presents that advantage of being wholly detachable from the frame without separating the whipper housing, the whipper device and the back wall.

The whipper assembly also presents that advantage that its dismantling can be handled with only one hand.

BRIEF DESCRIPTION OF THE DRAWINGS

The characteristics and advantages of the invention will be better understood in relation to FIG. 1 depicts a beverage dispenser comprising a whipper assembly.

DETAILED DESCRIPTION OF THE DRAWINGS

The other parts of the dispensers—in particular the reconstitution means 3 for preparing a beverage from a dose of the food or beverage ingredient powder—are common to existing prior art.

Figure 1:
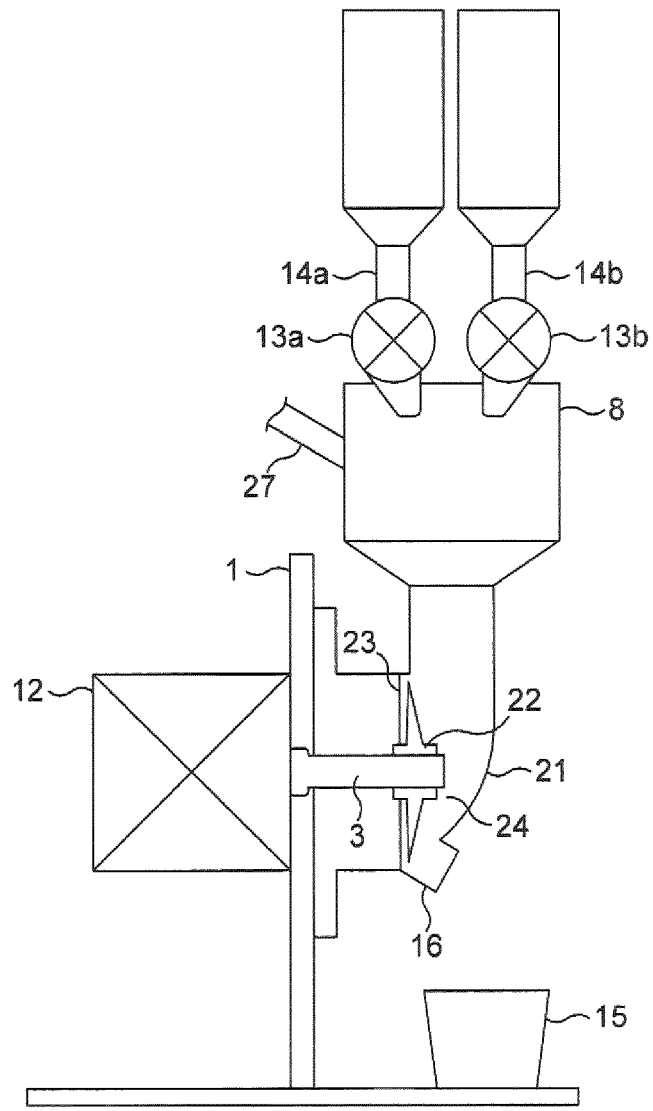

With reference to FIG. 1 the beverage dispenser comprises two food ingredient storing units 14a, 14b connected to respective dosing units 13a, 13b able to provide food ingredient doses to a common dissolution chamber 5. According to another embodiment the beverage dispenser can comprise a single dosing unit connected to the different storing units. The storing units 14a, 14b can be a disposable tank like a cartridge, a can or tin, a pouch, . . . or it can be a non disposable canister that is refilled with powder food ingredients.

The food ingredient can be any ingredient that forms a beverage when mixed with a liquid diluent. It can be a soluble powder or a soluble liquid concentrate like for example coffee, decaffeinated coffee, dehydrated culinary products, tea, chocolate or milk. When different storing units are present, they preferably contain different food ingredients.

In the illustrated embodiment, each of the dosing units consists in a barrel closely integrated in a cylindrical chamber. The end of the drive shaft of the barrel can present coupling means able to be coupled to a drive motor in the dispenser. Each of the dosing devices is placed at the bottom of the storing units to receive the powder therefrom by gravity.

The dose of food ingredient issued from a dosing unit 13a, 13b is delivered to the dissolution chamber 8 where it is mixed with a diluent, usually water, introduced from a diluent inlet 27. The shape of the chamber 8 and the orientation of the diluent inlet 27 are such that the diluent creates a sufficiently turbulent stream that helps the dissolution of the food ingredient in the diluent in the chamber. The mixture of the dissolved food ingredient is then introduced in a whipping chamber 24 constituted by the assembly of a whipping housing 21 and a back wall 23. The whipping chamber 24 comprises a whipper device 22 such an impeller. The whipper device is connected to a drive shaft 3 fixed to the frame 1 of the dispenser. The drive shaft is actuated by a motor 12. The whipped beverage leaves the whipper chamber 24 through an outlet 16 that can be connected to an outlet tube and is delivered in a cup 15.

Figure 2A:
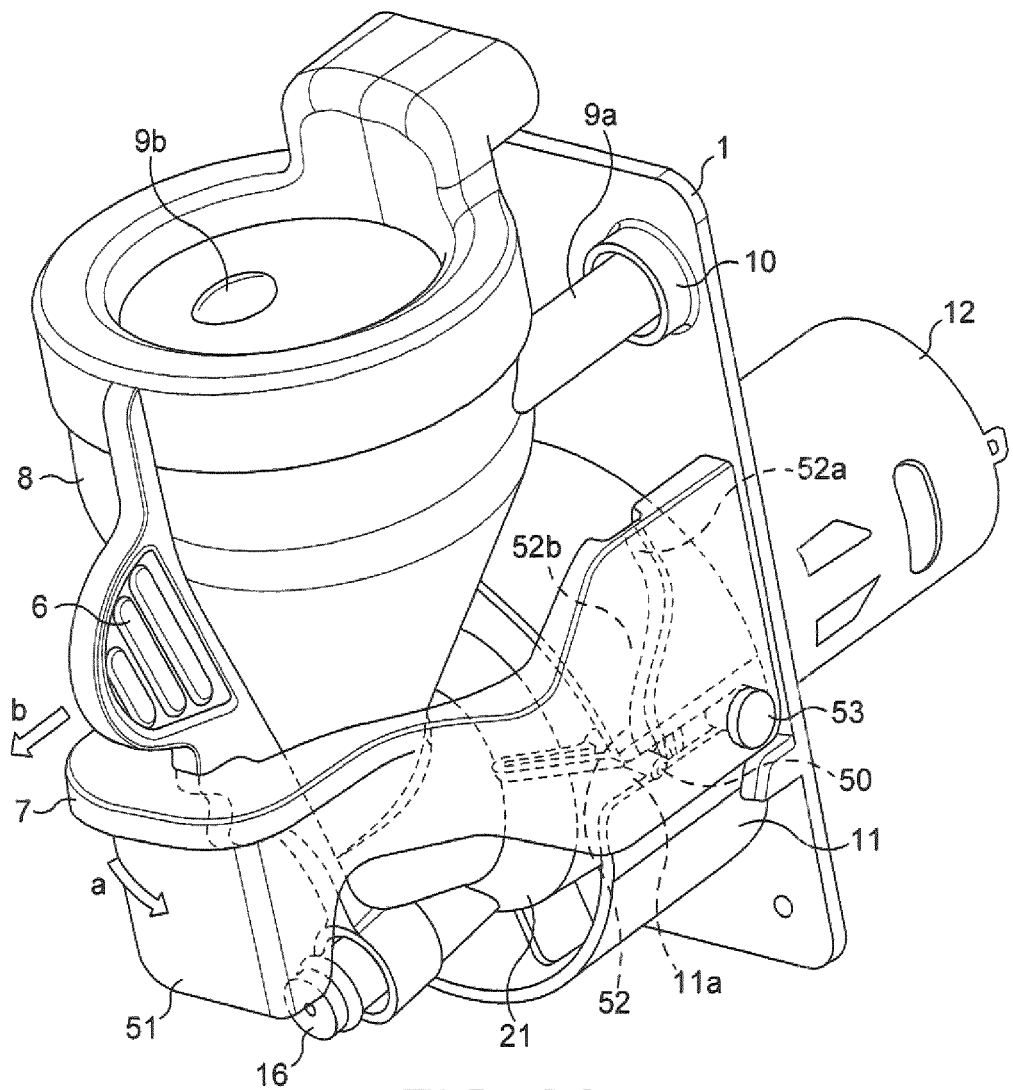
FIGS. 2A, 2B and 2C depict a perspective view of the whipper unit of a dispenser according to the present invention in its mounted position (FIG. 2A) and during its dismantling (FIGS. 2B and 2C).

FIG. 2A illustrates the whipper unit of a dispenser such as described in FIG. 1 according to the present invention in its mounted position.

The frame 1 of the dispenser supports the motor 12 that actuates the whipper assembly. The frame presents a receiving area 11 which in the illustrated embodiment has the shape of a horizontal cylinder in which the whipper assembly can fit in the mounted position.

The receiving area and the whipper housing 21 comprise corresponding detachable means for connecting each other together. In the whipper housing 21 this detachable means consists in two guiding pins 50 symmetrically placed on the lateral sides of the whipper housing (in the present invention the term lateral is understood relatively to the position of the whipper housing in its mounted position in the dispenser). These guiding pins 50 fit in slots 11a of the lateral sides of the cylinder of the receiving area 11. In the receiving area 11 the detachable means comprises a locking means 51 pivotally mounted to the cylinder of the receiving area 11 at two pivot points 53 symmetrically placed on the lateral sides of the cylinder. The locking means 51 is preferably a lever pivotally mounted at two pivot points 53. The lever can be pivoted between the mounted position of FIG. 2A and the dismounted positions of FIGS. 2b and 2C. The detachable means of the receiving area 11 also comprises a slot 52 cooperating with the guiding pin 50 of the whipper housing 21 so that said guiding pin 50 is able to slide in the slot 52 while the locking means 51 is pivoted and while the whipper housing is linearly slid out of the receiving area. For this reason the slot preferably presents a linear part 52a enabling the linear sliding of the whipper housing guiding pin 50 in or out of the receiving area and a curved part 52b enabling the rotation of the locking means 51 around the whipper housing 21 while said whipper housing is mounted in the receiving area 11. The slots 11a on each internal sides of the receiving area cylinder and the slots 52 on each internal lateral sides of the locking means 51 act as a guiding curves for the guiding pins 50 during the mounting and dismounting operation of the whipper assembly on the frame. On FIG. 2A, this locking means 51 is represented in a transparent fashion in order to make the cooperation of the guiding pin 50 and the slot 52 apparent.

The whipper assembly comprises a dissolution chamber 8 above the whipper housing 21. The dissolution chamber comprises a tube 9a to set the positioning of the whipper assembly relative to the frame in the mounted position. The frame presents hole 10 in which the tube 9a is able to slide for helping this positioning. It also presents a similar hole on the other side of the whipper assembly to connect the diluent inlet 27 to the dissolution chamber. The whipper assembly of FIG. 2A presents two tubes 9a, 9b symmetrically disposed on the lateral sides of dissolution chamber 8. One of the tube 9a is full and has only a guiding function, whereas the other tube 9b is hollow and is also the diluent supply for the dissolution chamber.

Figure 2B:
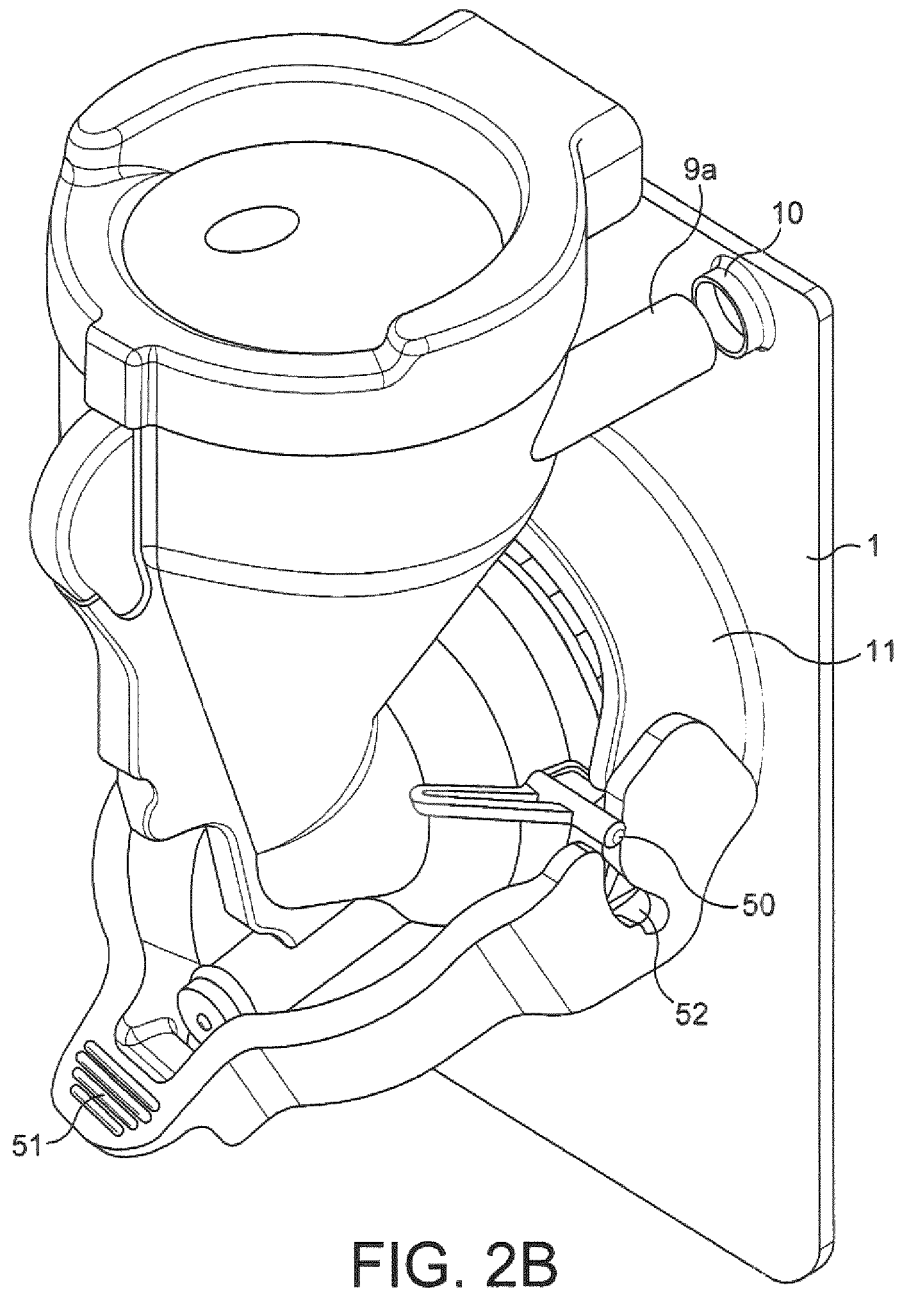
Figure 2C:
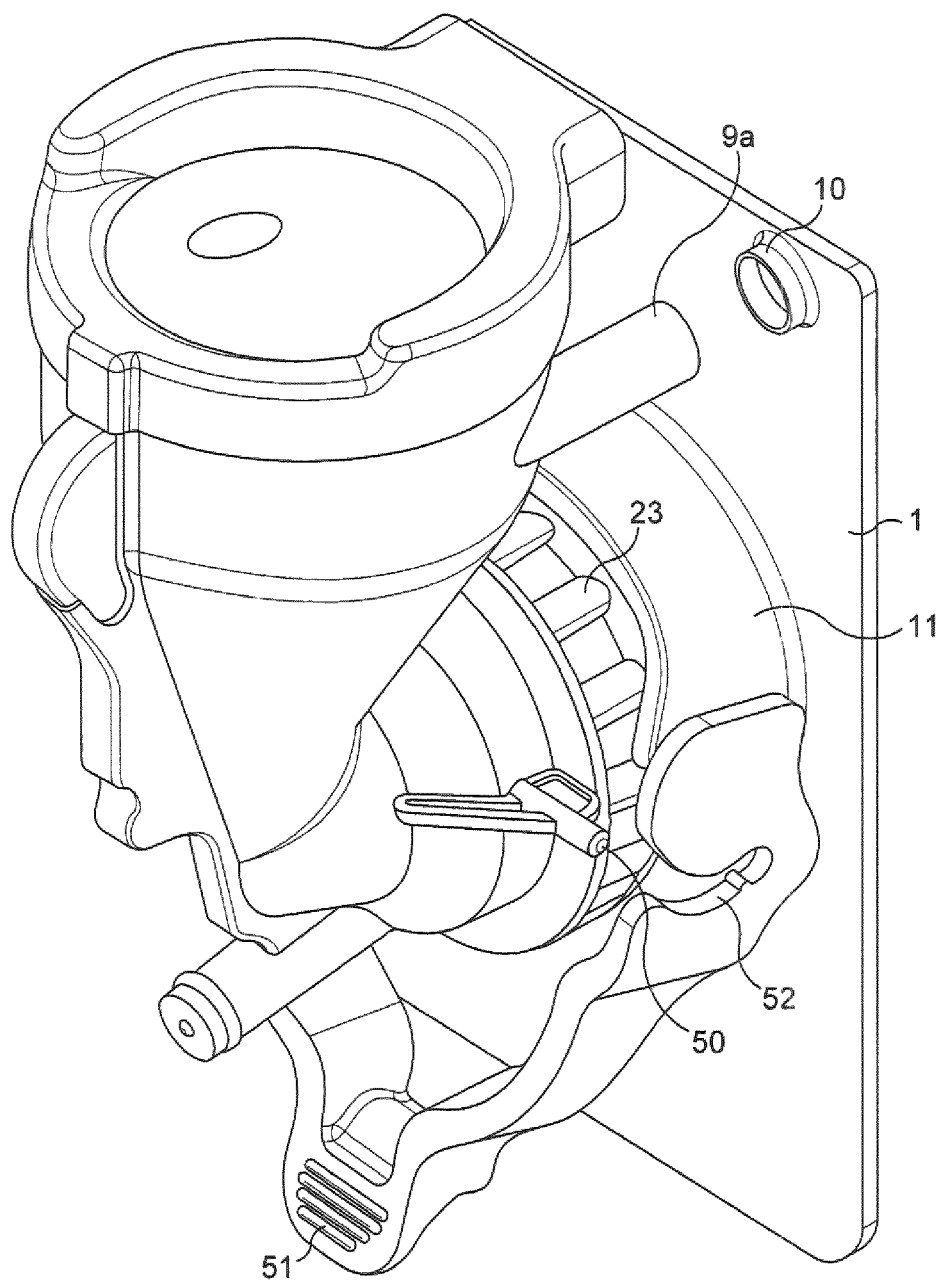

For dismounting the whipper assembly from the dispenser, the locking means 51 of the receiving area 11 is detached by applying a downward force on said locking means (arrow a). If the outlet 16 of the whipper chamber 24 is connected to a tube, this tube is previously disconnected from the outlet 16 to enable the movement of the locking means 51. The application of the force can be helped by the presence of a handle 7 on the locking means 51. Due to this downward force, the locking means 51 rotates around the pivot points 53 which makes the slot 52 slides around the guiding pin 50 of the whipper housing. The length of the curved part 52b of the slot 52 is defined so that when the end of said curved part 52b reaches the guiding pin 50 of the whipper housing, then the locking means 51 is totally disengaged from the front part of the whipper housing 21 and the latter can freely horizontally slide out of the receiving area 11. The front part is defined by opposition to the back wall of the whipper assembly. FIGS. 2B and 2C illustrate the downward movement of the locking means 51 from the position according to FIG. 2A until the dismounting position according to FIG. 2C. During the downward movement, the locking means can simultaneously initiate a forward movement of the whipper assembly, during which the disconnection of the tubes 9a, 9b from the tubes 10 starts as it appears from the successive views on FIGS. 2B and 2C. The linear part 52a of the slot 52 is oriented so that when the end of the curved part 52b has reached the guiding pin 50 of the whipper housing, the linear curve 52a is horizontally oriented. In this position the linear curve 52a covers the horizontal slot 11a of the receiving area 11. Then after the application of the downward force (arrow a), a horizontal force (arrow b) can be applied to horizontally pull the whipper assembly out of the receiving area 11. The application of the force can be helped by the presence of a handle 6 on the whipper housing or on the dissolution chamber. It can be noticed that in FIGS. 2B and 2C, the locking means 51 present a slightly different shape from the locking means of FIG. 2A and in particular that the slots in each internal lateral sides of the locking means 51 are dug through the whole thickness of the locking means sides. This particular arrangement doesn't change the functions of the different elements and remains in the scope of the present invention.

Figure 3:
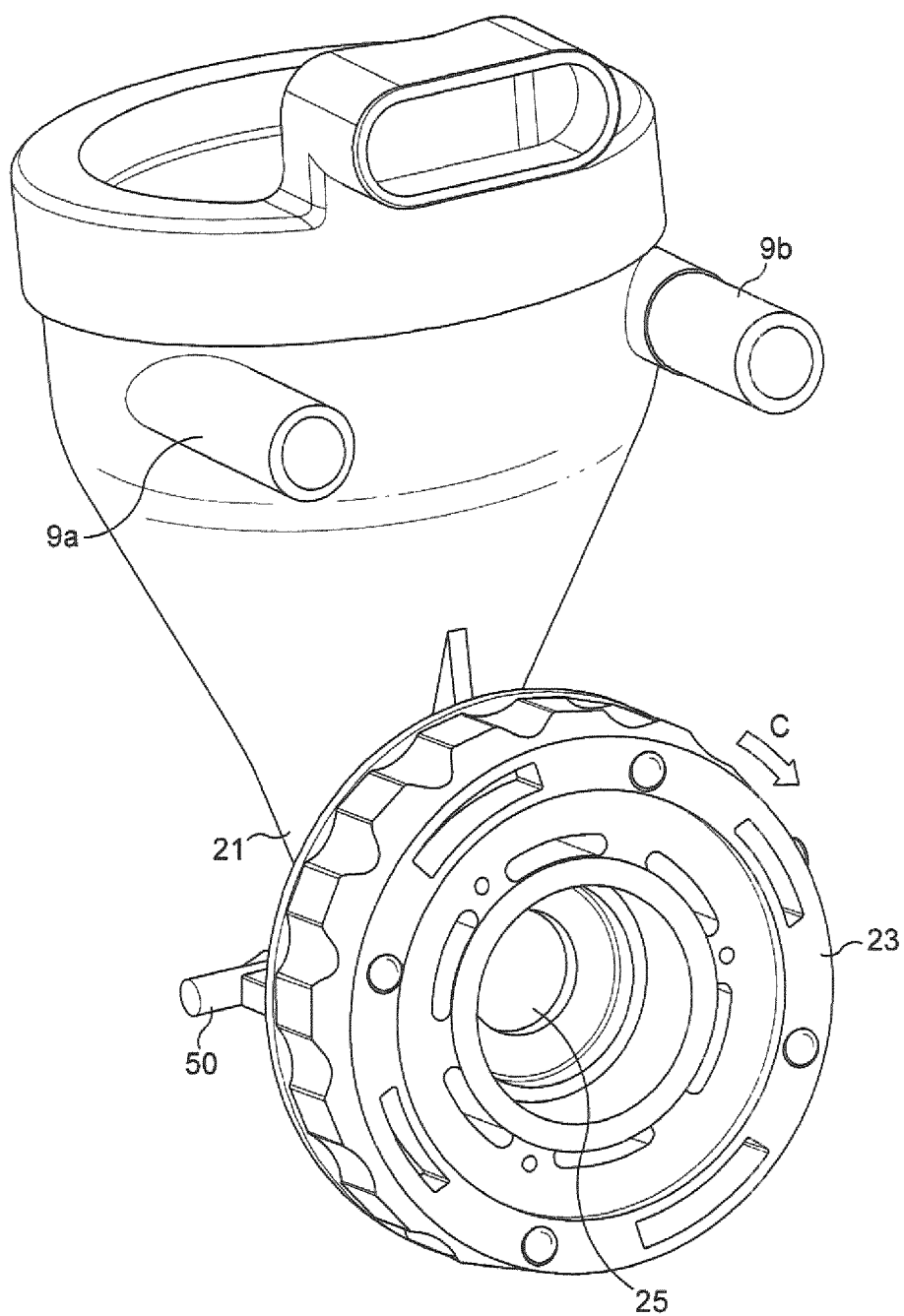
FIGS. 3 and 4 depict perspective views of the whipper assembly illustrated in FIG. 2 in dismounted positions.
Figure 4:
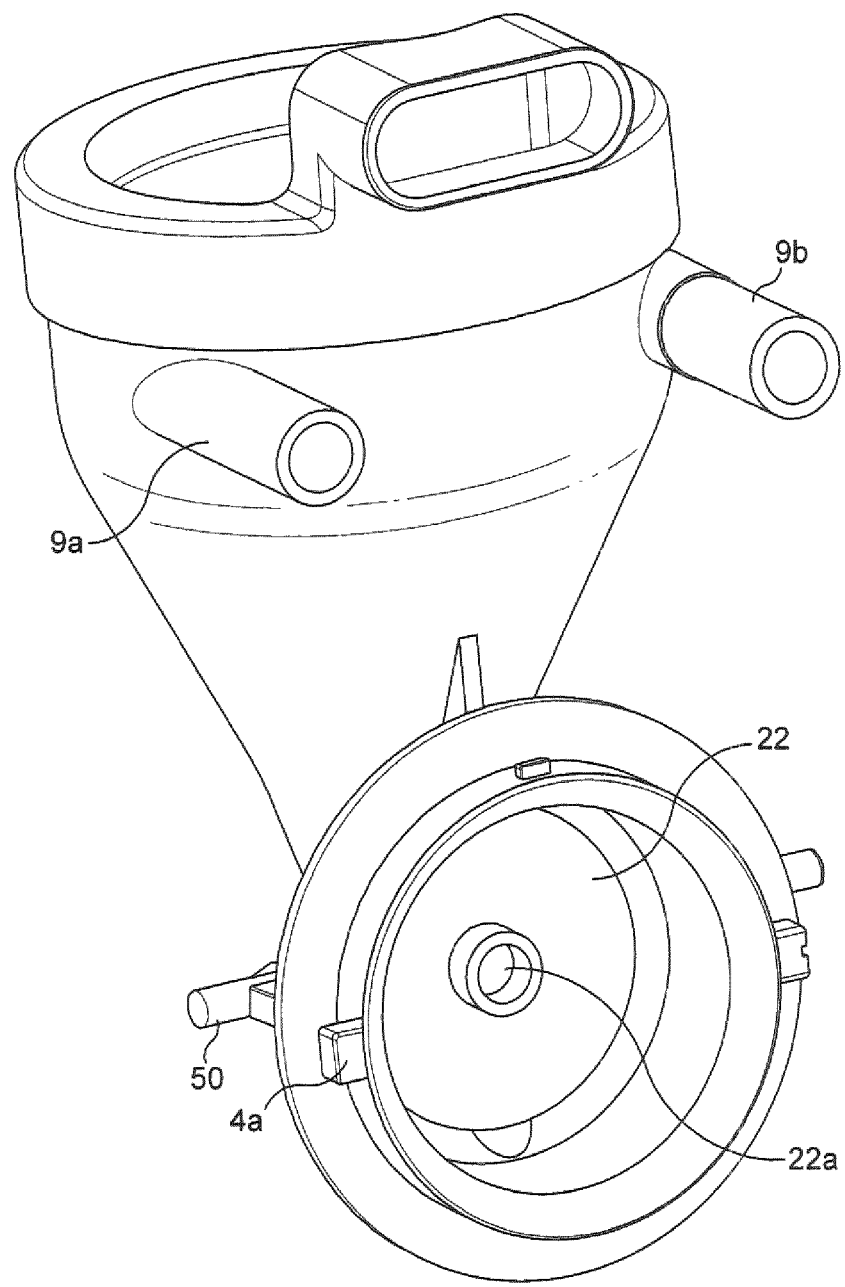
Figure 5:
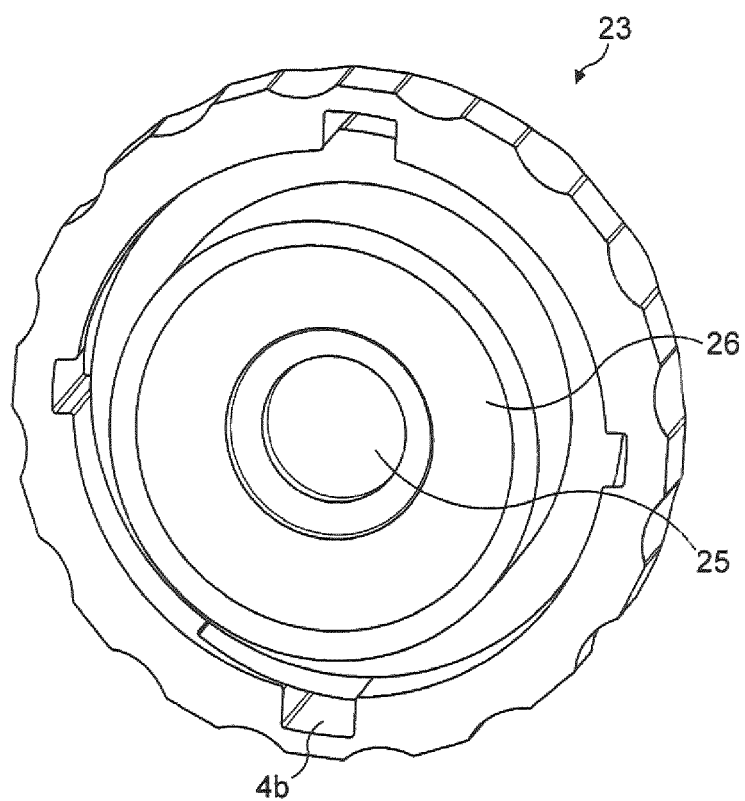
FIG. 5 depict a perspective view of the back wall of the whipper assembly illustrated in FIG. 2.

Further to that last step the whipper assembly is dismounted from the frame 1 such as illustrated in FIG. 3. The whipper assembly still comprises the whipping device 25 inside and the back wall 23 which avoids dirtying the dispenser and the place around the dispenser if a fluid remains in the chamber 24. The operator can in one step take all the whipper assembly components to the place where he is going to clean them. Once the operator is ready to clean the different parts of the whipper assembly, he can separate the back wall 23 from the whipper housing 21 by rotating the back wall 23 relatively to the whipper housing 21 according to the arrow c. FIGS. 4 and 5 illustrate the connection means that removably attach the back wall 23 to the whipper housing 21 and that are composed of a cam 4a on the whipper housing and a cam track 4b on the back wall. Further to this step the three elements 21, 22, 23 of the whipper assembly can be separately thoroughly cleaned.

For reassembling, the back wall 23 and the whipper housing 21 are connected again with the whipper device 22 in between. FIG. 5 illustrates the recess 26 in the front face of the back wall 23 that enables the positioning of the whipper in the whipper chamber 24 and that helps the reassembling of the different elements together and the cooperation of the whipper with free end of the drive shaft. The opening 22a is forced to cooperate with the opening 25 of the back wall such as is made apparent in FIG. 3 during reassembling.

Then the whipper assembly such as illustrated in FIG. 3 can be reassembled with the frame 1: the assembly is slid in the receiving area 11; the two guiding pins 50 slide in the slot 11a of the receiving area and the linear slot 52a of the locking means. At the end of the sliding, the guiding tube 10 and hole 10 in the frame help the operator to correctly position the whipper assembly. The operator simultaneously connects the tube 9b for the diluent supply. Due to the linear guiding of the whipper assembly in the receiving area, the opening 22a at the centre of the whipper device automatically meets the end of the drive shaft. The connection is helped by having whipper device opening 22a and end of the drive shaft presenting corresponding shapes. One of these components can also be at least partially made of a magnetic material so that they connect together. Finally the operator attaches the whipper assembly to the frame by upwardly closing the locking means 51 around the whipper housing 21. The locking means 51 preferably presents an internal shape that fits exactly with the external shape of the whipper housing to prevent any movement of the whipper assembly during the use of the dispenser.

The dispenser of the present invention presents the advantage that the whipper assembly is wholly detachable from the frame without separating the whipper housing, the whipper device and the back wall. Consequently it avoids that some rest of the beverage in the mixing chamber falls in the internal parts of the machine during dismantling.

The present invention presents also the advantage of enabling an easy and rapid disassembling and reassembling of the components of the whipper assembly.

The present invention presents also the advantage of forcing the operator to dismount all the parts of the whipper assembly and then to clean all of them. He cannot skip the cleaning of some components. The different parts of the whipping assembly can then be thoroughly cleaned with a brush and even wash in a dish washer.

The invention claimed is:

1. A beverage dispenser comprising:
   a frame for supporting the components of the dispenser;
   a whipper assembly comprising a whipper housing, a whipper device and a back wall, the whipper housing and the back wall forming a whipper chamber in which is housed the whipper device,
   a drive shaft for driving the whipper device, the drive shaft being supported by the frame,
   a detachable connection for attaching the back wall to the whipper housing, and
   the dispenser comprises a detachable connection member for attaching the whipper housing to the frame.

2. The beverage dispenser of claim 1, wherein the detachable connection for attaching the back wall to the whipper housing comprises a cam and a cam track.

3. The beverage dispenser of claim 1, wherein the whipper assembly comprises a handle.

4. The beverage dispenser of claim 1, wherein the whipper assembly comprises a dissolution chamber above the whipper housing.

5. The beverage dispenser of claim 1, wherein the back wall of the whipper assembly comprises:
   an opening for holding the driving end of the drive shaft; and
   a recess for positioning the whipper device.

6. The beverage dispenser of claim 1, wherein the driving end of the drive shaft or the whipper device is made at least partially of a magnetic material.

7. A beverage dispenser comprising:
   a frame for supporting the components of the dispenser;
   a whipper assembly comprising a whipper housing, a whipper device and a back wall, the whipper housing and the back wall forming a whipper chamber in which is housed the whipper device,
   a drive shaft for driving the whipper device, the drive shaft being supported by the frame,
   a detachable connection for attaching the back wall to the whipper housing, and
   the dispenser comprises a detachable connection member for attaching the whipper housing to the frame,
   wherein the frame comprises a receiving area for positioning the whipper assembly, and the receiving area and the whipper housing present corresponding detachable connection member, the receiving area of the frame is a cylinder in which the whipper chamber is able to slide, and the detachable connection member of the receiving area is a lock pivotally mounted to the cylinder at two symmetric pivot points.

8. The beverage dispenser of claim 7, wherein the lock comprises a handle.

9. The beverage dispenser of claim 7, wherein the detachable connection member of the whipper housing is a guiding pin and the lock comprises a slot cooperating with the guiding pin so that the guiding pin is able to slide in the slot while the lock is pivoted and while the whipper housing is linearly slid out of the receiving area.

10. A method for cleaning a beverage dispenser, the method comprising:
    disconnecting a whole whipping assembly of the dispenser from a frame of the dispenser;
    disconnecting a back wall of the dispenser from a whipper housing of the dispenser;
    separately cleaning a back wall, the whipper housing and a whipper member,
    connecting the back wall and the whipper housing with the whipper member in a whipper chamber; and
    connecting the whole whipping assembly to the frame.

11. A beverage dispenser comprising:
    a frame for supporting the components of the dispenser;
    a whipper assembly comprising a whipper housing, a whipper device and a back wall, the whipper housing and the back wall forming a whipper chamber in which is housed the whipper device,
    a drive shaft for driving the whipper device, the drive shaft being supported by the frame,
    a detachable connection for attaching the back wall to the whipper housing, and
    the dispenser comprises a detachable connection member for attaching the whipper housing to the frame,
    wherein the whipper assembly comprises a guide for positioning the dissolution chamber relative to the frame, the guide comprising at least one diluent supply tube that is able to fit in a corresponding hole in the frame.

* * * * *